C. E. SMITH.

BELT ATTACHMENT.

APPLICATION FILED SEPT. 22, 1908.

12,897. Reissued Dec. 15, 1908.

Witnesses:
Chas. A. Pearce
R. L. Parrott

Inventor
CLARENCE E. SMITH
By his Attorneys
Banister & Prince & Mulcahey

THE NORRIS PETERS CO., WASHINGTON, D. C.

UNITED STATES PATENT OFFICE.

CLARENCE E. SMITH, OF NEW BRITAIN, CONNECTICUT, ASSIGNOR TO NORTH & JUDD MANUFACTURING COMPANY, OF NEW BRITAIN, CONNECTICUT, A CORPORATION OF CONNECTICUT.

BELT ATTACHMENT.

No. 12,897. Specification of Reissued Letters Patent. Reissued Dec. 15, 1908.

Original No. 890,383, dated June 9, 1908, Serial No. 406,878. Application for reissue filed September 22, 1908. Serial No. 454,278.

*To all whom it may concern:*

Be it known that I, CLARENCE E. SMITH, a citizen of the United States, residing at New Britain, county of Hartford, and State of Connecticut, have invented new and useful Improvements in Belt Attachments, of which the following is a specification.

My invention relates to improvements in the construction of belt attachments, and more particularly to belt buckles and slides.

The object of my invention is to provide certain improvements in construction including a new method of attaching the tongue carrying bar. In the case of an ornamental buckle or slide in which a tongue is not used, the said bar may be employed with much advantage to secure the buckle plate in position on the belt.

While I have shown and described the preferred form, it is to be understood that within the scope of the claims minor changes may be made without departing from the scope of my invention.

Figure 1:
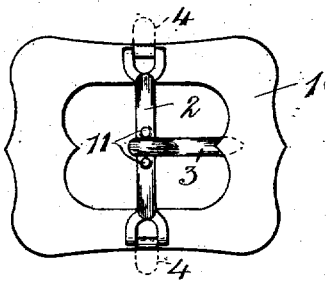
Figure 2:
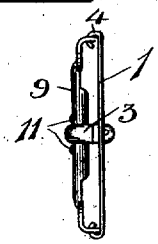
Figure 3:
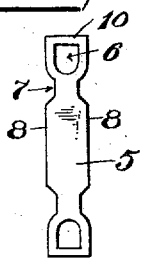
Figure 4:
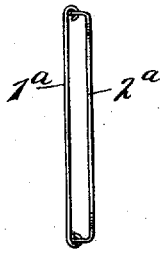
Figure 5:
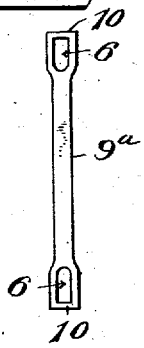

In the drawings, Figure 1 is a view in rear elevation of my improved invention as applied to a buckle. Fig. 2 is a view in side elevation of the same. Fig. 3 is a plan view of a detail partly formed. Fig. 4 is a view in side elevation of a modification as applied to a belt slide. Fig. 5 is a plan view of a detail.

1 represents the front or buckle plate.

2 is the back bar.

3 is the tongue.

4—4 are oppositely disposed ears extending from the outer edges of the plate 1.

5 is a blank, from which the back bar is formed (see Fig. 3).

6—6 are perforations near each end of the blank, and 7—7 are indentations on the side, forming stirrup-like extremities and side members 8—8. The central portion of the stock or body 9 is struck up and the side members 8—8 are turned in until they meet, as shown in Fig. 2 to form a hollow bar. The stirrup-like extremities are bent intermediate their length at right angles to the main body 9. The ears 4—4 are bent up and over the end portions 10—10 and firmly secured to the bar 2 and the belt buckle 1, the perforations 6—6 being of such size as to nicely receive the ears 4—4 whereby side motion is prevented.

11—11 are nibs struck up on each side of the center of the body 9 to secure the tongue 3 in place.

To provide clearance between the plate 1 and the back bar 2 for belts of greater or less thickness, the blank 5 is made either longer or shorter, as the case may be.

In Figs. 4 and 5 I have shown a modification in the form of a belt slide, in which the tongue is omitted, and the back bar $2^a$ is used simply to secure the plate $1^a$ on the belt. In this case the blank is made without the side members 8—8 as shown in Fig. 5 and the body or stock $9^a$ is left flat. The extremities are of the same formation as previously described.

What I claim is:

1. In a belt attachment, the combination with a front plate of a tubular back bar having perforated ends bent at an angle thereto, a tongue on said bar, oppositely disposed ears projecting from the edges of said plate engaging the bar end perforations, and nibs struck up on said bar keeping said tongue in position.

2. In a belt attachment, the combination with a front plate of a tubular back bar having perforated ends bent at an angle thereto, a tongue on said bar, and ears on the front plate engaging in the perforations of said bar to secure the latter to the front plate.

3. In a belt attachment, the combination with a front plate, of a back bar having perforated stirrup-like ends bent at an angle to the body of said bar, said front plate having a part thereof engaging in each perforation and connecting the back bar to the rear of said plate.

4. In a belt attachment in combination, a front plate, a back bar having perforated stirrup-like ends bent at an angle thereto, a tongue on said bar, means to limit the lateral movement of said tongue thereon, and means carried by the front plate and engaging said stirrup-like ends to secure the bar to the rear of said front plate.

CLARENCE E. SMITH.

Witnesses:
PETER F. O'DONNELL,
LOUIS ANDERSON.